United States Patent [19]

Zarr

[11] 4,313,143
[45] Jan. 26, 1982

[54] HEAD POSITIONING MECHANISM FOR DATA CARTRIDGE RECORDER

[75] Inventor: Myron Zarr, St. Paul, Minn.

[73] Assignee: Minnesota Mining and Manufacturing Co., St. Paul, Minn.

[21] Appl. No.: 72,228

[22] Filed: Sep. 4, 1979

[51] Int. Cl.³ .............................................. G11B 17/00
[52] U.S. Cl. .................................................... 360/106
[58] Field of Search .................. 360/78, 106; 242/199, 242/200, 210

[56] References Cited

U.S. PATENT DOCUMENTS

| | | | |
|---|---|---|---|
| 3,641,279 | 2/1972 | Ganske | 360/78 X |
| 3,764,147 | 10/1973 | Hirano | 360/78 |
| 4,005,493 | 1/1977 | Morgan | 360/106 |
| 4,050,089 | 9/1977 | Okamoto | 360/106 |

*Primary Examiner*—Aristotelis M. Psitos
*Attorney, Agent, or Firm*—Cruzan Alexander; Donald M. Sell; William B. Barte

[57] ABSTRACT

A head positioning mechanism for a multitrack data cartridge recorder including a stepper motor, lead screw and screw follower assembly for incrementally moving a record/playback head transverse to the path of a magnetic recording tape to enable accurate positioning of the head at any given track across the tape.

6 Claims, 6 Drawing Figures

HEAD POSITIONING MECHANISM FOR DATA CARTRIDGE RECORDER

FIELD OF THE INVENTION

This invention reates to magnetic tape recorders and to subassemblies utilized therein, particularly with respect to recorders adapted for multiple track recording using a single track head which is transversely movable with respect to the tape.

DESCRIPTION OF PRIOR ART

Data recording cartridges and recorders adapted for their use are notably disclosed and claimed in U.S. Pat. No. 3,692,225 (Von Behren). In the cartridge there disclosed, a magnetic recording tape is preloaded in a reel-to-reel type enclosure together with an endless flexible belt in frictional contact with the tape on both reel hubs for bidirectionally driving the tape, including rapid accelerations and decelerations, such as are encountered in digital data recording and playback. While the system there set forth represents many advantages such that data cartridges are filling an important need in the computer industry, especially as backup storage for minicomputer and microprocessor based systems, heretofore they have not been able to offer sufficient capacity to backup fixed mounted rigid disk systems. Recorders adapted to use such data cartridges have heretofore been designed to employ fixed, multitrack heads which are complex, expensive and difficult to maintain in proper alignment.

SUMMARY OF THE INVENTION

In contrast to the fixed multitrack tape cartridge recorder disclosed in the above-cited patent, the present invention is directed to a data cartridge recorder adapted for multitrack operation in which an inexpensive and simple single track record/playback head is adapted to interface with a tape driven along a transport path for the tape and to be variably positioned transversely with respect to the width of the tape to enable recording and playback of any of the plurality of parallel tracks.

Particularly, the present invention is directed to a head positioning mechanism which includes a linear support means, a head mounting means, biasing means and means for driving the mounting means. The linear support means is secured proximate to the transport path and perpendicular to the direction of tape motion, and is adapted to have the head mounting means slideably mounted thereon. The mounting means is in turn adapted for receiving the head to allow linear motion thereof across the tape. In the absence of any counteracting force, the mounting means are further directed to move the head toward one edge of the tape by biasing means, while means for driving the mounting means responds to incremental electrical signals of one polarity for driving the mounting means against the bias.

Accordingly, the head may be incrementally moved toward the opposite edge of the tape. Alternatively, the driving means is also responsive to incremental electrical signals of an opposite polarity for controlling the motion of the mounting means as directed by the biasing means, thereby controlling the incremental movement of the head toward the first edge. The driving means specifically includes a stepper motor secured relative to the transport path, a lead screw mounted to the drive shaft of the motor for converting rotary motion of the shaft into a corresponding linear movement, and means coupled to the lead screw for coupling the linear movement thereof to the head mounting means.

In a preferred embodiment, interlock means are also provided for responding to the linear movement of the lead screw and hence of the head transverse to the tape for interacting with ejection means adapted to eject cartridges from the recorder to allow activation of the ejection means only when the lead screw is positioned such that the head gap is adjacent or below one edge of the tape. The interlock means prevents removal of the cartridge while the head is in contact with the information bearing tape surface, thus preventing accidental loss of data.

DESCRIPTION OF THE PREFERRED EMBODIMENT

Figure 1:
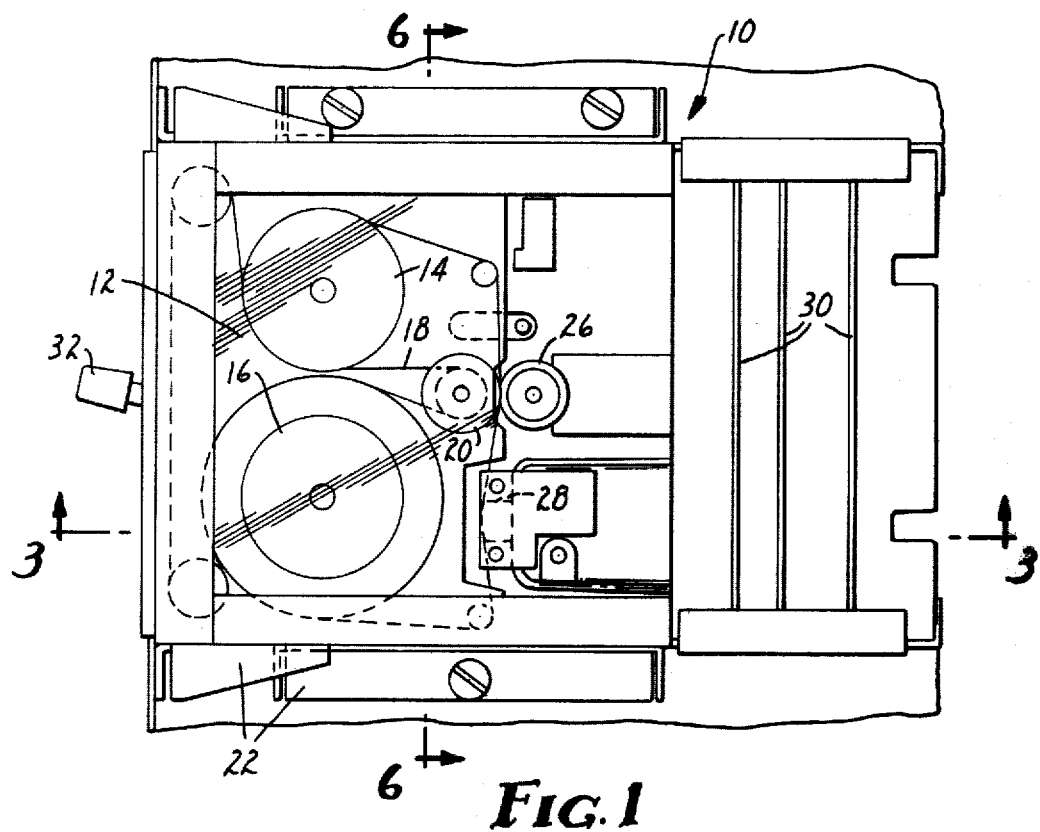
FIG. 1 is a top view of a data cartridge drive assembly embodying the present invention.

A preferred embodiment of a data cartridge drive mechanism embodying the present invention, is shown in a top view in FIG. 1. As may there be seen, the drive assembly 10 is adapted to receive a data cartridge 12, which as disclosed in U.S. Pat. No. 3,692,255 (Von Behren), includes a pair of spools 14 and 16 between which a magnetic recording tape extends. The cartridge further includes an endless flexible belt 18 which extends around the periphery of the tape on the spools 14 and 16 and about a drive roller 20 thereby providing the driving force on the spools 14 and 16.

The assembly 10 particularly includes a housing 22, which includes a front opening 24 into which the cartridge 12 may be inserted. Upon such insertion, the drive roller 20 is brought into spring loaded contact with the drive wheel 26, while the tape is pressed against the record and playback head 28. Also evident in FIG. 1 are a plurality of printed circuit boards 30 containing electronic circuits for controlling the operation of the mechanism assembly and the recording and playback of actual digital data. The assembly further includes eject lever 32 for activating an eject mechanism (not shown) to enable withdrawing a cartridge from the drive mechanism.

Figure 2:
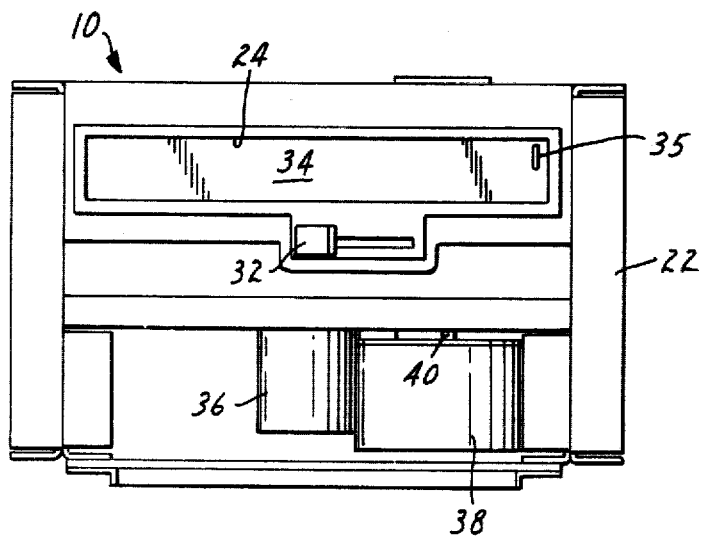
FIG. 2 is a front view of the drive assembly shown in FIG. 1.

The assembly shown in FIG. 1 is further shown in the front view set forth in FIG. 2, where it may be seen that the opening 24 through which a data cartridge 12 may be inserted includes a panel 34. The panel 34 is provided with a protrusion 35 on the front thereof which engages with the rear underside of a cartridge inserted therein to ensure proper positioning, and is desirably hinged at the bottom to further support the cartridge. Likewise, the mounting of the eject lever 32 is there seen in full. Also visible in the front view of FIG. 2 is a drive motor 36 and a stepping motor 38. The shaft of the drive motor 36

(not shown) is coupled to the drive wheel 26, while the stepping motor 38 is coupled to means for positioning the head 28 transversely across the tape.

Figure 3:
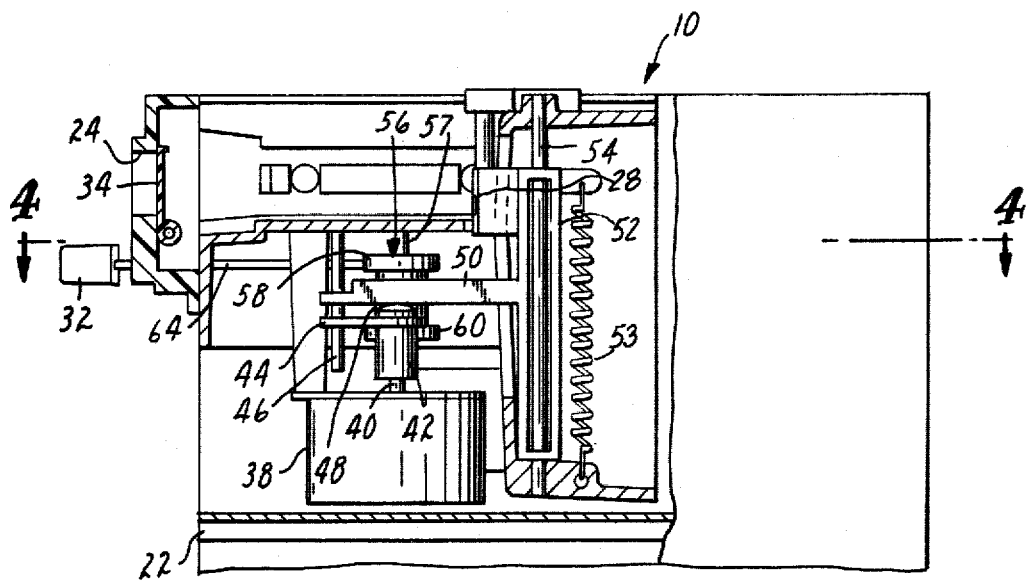
FIG. 3 is a sectional side view of the assembly shown in the preceding figures.

Details of the positioning mechanism of the present invention are shown in the side sectional view of FIG. 3 which is taken along the line 3—3 of the view shown in FIG. 1. In FIG. 3 it may be seen that the assembly includes the stepping motor 38, the drive shaft 40 of which functions as a lead screw having threaded thereon a screw follower member 42. The follower 42 includes a projection 44 which interacts with a guide stud 46 so as to allow only linear motion of the follower member. That member further includes an axially symmetric dome 48 which bears against a projection 50 of the head slide mount 52, which in turn is slideably mounted on a stationary shaft 54. The domed shape is used to accommodate wobble of the lead screw and the follower and to eliminate non-linear motion, thus minimizing vertical displacement errors. Positioned on the mount 52 is the record/playback head 28 also shown in FIG. 1. The head slide mount 52 is biased downward by a coil spring 53 such that the projecting arm 50 is always in contact with the dome 48 of the screw follower 42.

Referring to FIG. 3, it may there be seen that the operation of the head positioning mechanism is initiated by energization of the stepper motor 38 with incremental pulses of a given polarity. Assuming a first polarity which is such as to drive the lead screw 40 in a direction so as to advance the screw follower member 42 against that of the mechanical bias provided by the coil spring, the head slide mount 52 will be raised, thereby moving the record/playback head 28 vertically upward so as to position the head gap at any given track location along a magnetic recording tape placed in contact with it. Conversely, if opposite polarity signals are applied to the stepping motor 38, the lead screw 40 will be rotated so as to cause the follower member 42 to be incrementally lowered, allowing the bias to force the slide mount 52 downward, thereby bringing the head into successive lower positions with respect to a tape positioned adjacent to it.

Another embodiment of the present invention includes interlock means responsive to the linear motion of the lead screw, and hence of the record/playback head relative to the tape, for interacting with ejection means for allowing activation of the ejection means only when the lead screw is positioned such that the recorder/playback head 28 is adjacent or below one edge of the tape, thereby preventing loss of data such as could occur in the event the eject mechanism is activated while the head gap is in a record or playback mode. Preferably, such interlock means includes a spool 56 mounted on a vertical post 57 and having upper and lower flanges 58 and 60 respectively. The lower flange 60 is adapted to interact with a projection on the screw follower 42 (not shown in FIG. 3) such that when the follower member is lowered beyond a given point, the projection contacts the lower flange 60 and pulls the spool downward. The upper flange 58 of the spool 56 is adapted to contact a portion of the eject lever 32 when the spool 56 is in a raised position. Thus, when the spool is lowered by the projection on the screw follower bearing against the lower flange 60, the upper flange is similarly lowered, thus allowing free movement of the lever 32.

Figure 4:
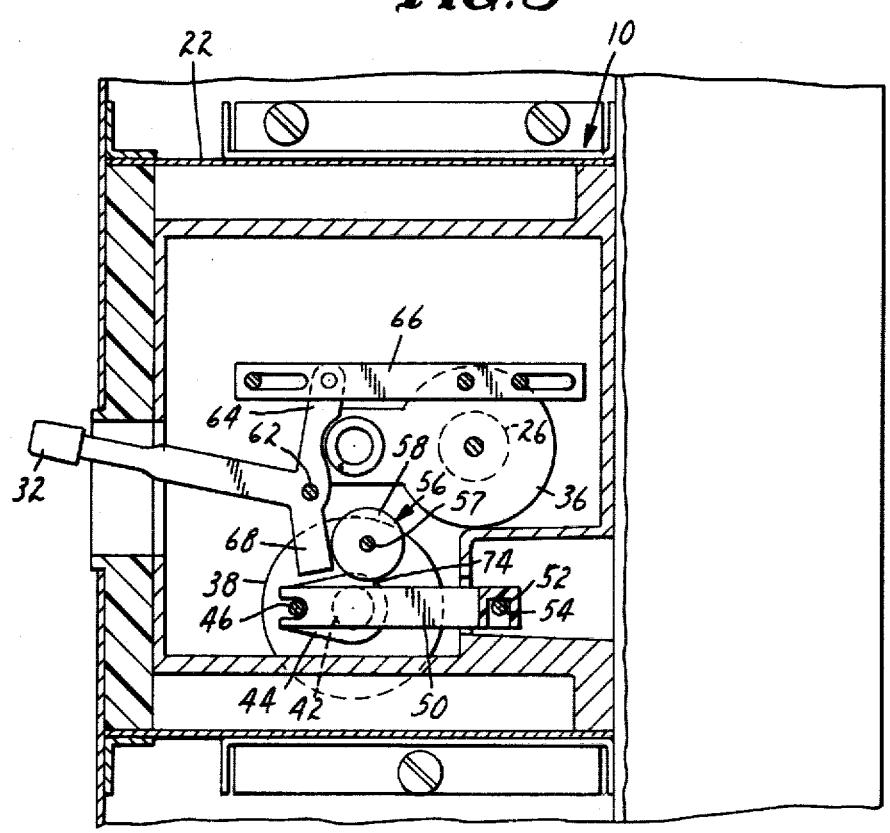
FIG. 4 is a top sectional view of the assembly taken along the line marked 4—4 in FIG. 3.

The interaction of the eject interlock means is further shown in the top sectional view of FIG. 4, taken along the line 4—4 of FIG. 3. In that view it may be seen that the eject lever 32 includes three interconnected arms which are pivoted about post 62, a first arm projecting through an opening in the front of the assembly to allow the lever to be manually activated. The lever further includes a second arm 64 within the mechanism which is adapted to engage the eject mechanism 66 for partially ejecting a cartridge from the assembly. A third arm 68 is adapted to bear against the upper flange 58 of the spool 56 as discussed above. Also shown in FIG. 4 is the drive motor 36, and portions of the head positioning members 46, 50, 52 and 54.

Figure 5:
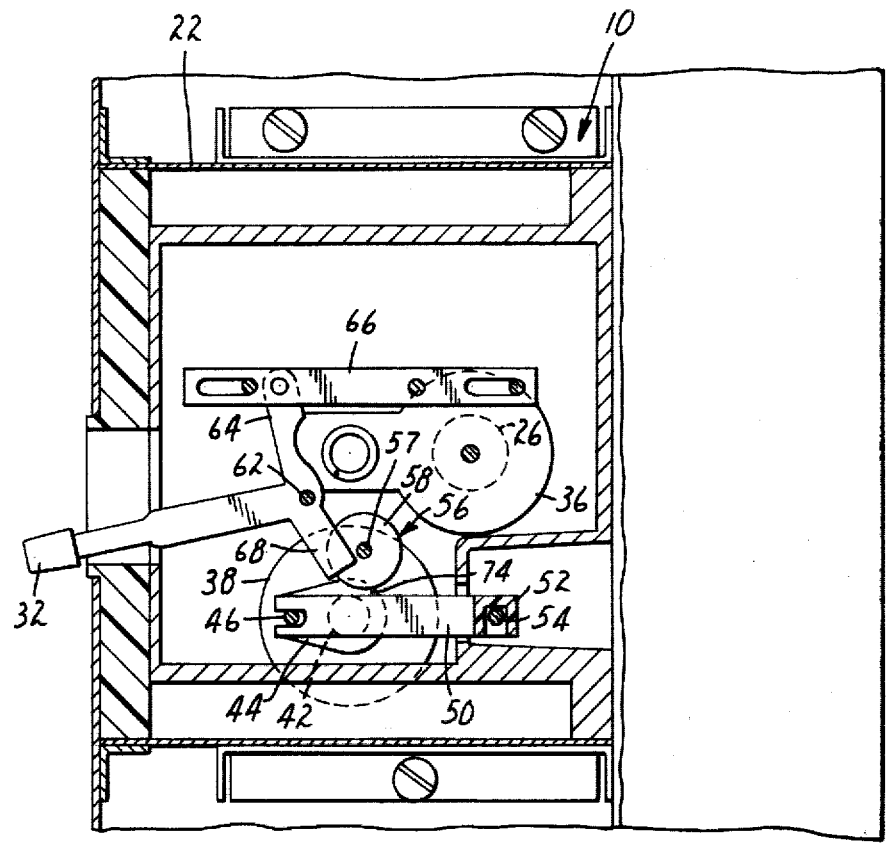
FIG. 5 is another top sectional view taken along the line marked 4—4 in FIG. 3 showing the eject mechanism in a different operating position.

In another view similar to that shown in FIG. 4, the eject mechanism is shown in FIG. 5 in a position at which a cartridge would be ejected from the assembly. As is there shown, the eject lever 32 has been rotated counterclockwise about post 62 such that the second arm 64 has caused the eject mechanism 66 to be moved to the left, thereby ejecting a cartridge. The third arm 68 is there shown to have been rotated into a position over the upper flange 58 of the spool 56, which has been lowered against a bias provided by an axially mounted coil spring (not shown) by the downward motion of the head slide mount 52 and the lowering of the lead screw and the screw follower 42.

Figure 6:
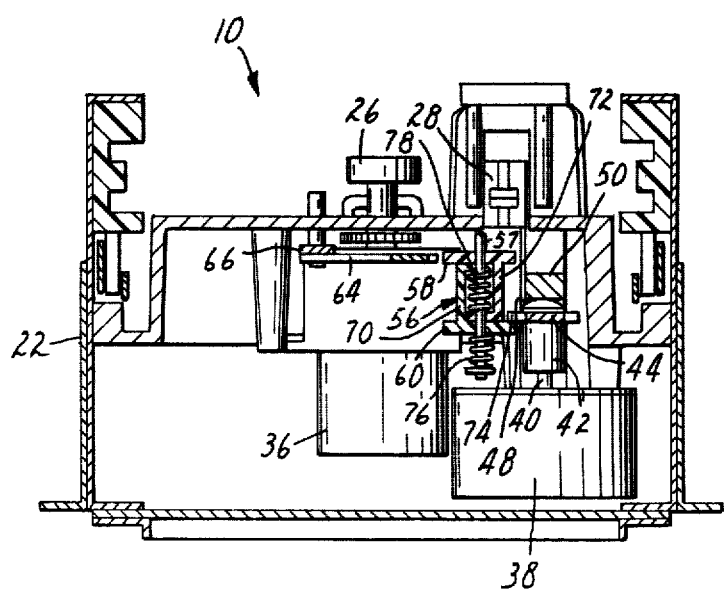
FIG. 6 is a front sectional view taken along the lines 6—6 of FIG. 1.

A further clarifying view of the present invention is shown in the front sectional view shown in FIG. 6, where in addition to the stepper motor 38 and the associated head positioning members, the eject mechanism is shown in more detail. In this view it may be seen that the spool 56 is preferably formed of two cylindrical halves 70 and 72 respectively, with the first half 70 being formed as a part of the upper flange 58 and the second half 72 being formed as a part of the lower flange 60. The two members are assembled on the fixed post 57 so as to allow vertical motion in response to action of the projection 74 on the screw follower 42 acting on the lower flange 60. Such downward motion of the spool is resisted by means of a coil spring 76 also mounted on the post 57. The two halves of the spool are further coupled by means of a second coil spring 78 mounted within the respective halves and bearing against internal flanges within each half. Thus, when the lower half is forced downward, the spring is compressed and provides a restoring bias which forces the upper half downward when it is released.

In operation, the lead screw follower is lowered against a physical stop defining an initial reference position at which ejectment and/or insertion of a data cartridge is allowed. Upon such an insertion, the stepper motor is desirably pulsed so that the head gap traverses the edge of the tape onto the tape surface. Following, the motor is again pulsed but in a reverse direction until the head gap is located at the edge of the tape. This corresponds to a zero reference position for the head gap. Once this zero position is determined, the motor is again pulsed a given number of times to incrementally raise the head gap to any desired track.

The split spool allows the lead screw follower to come to its initial reference position regardless of any restraining force on the upper flange 58. In contrast, if the spool is constructed in one piece, and the ejection operation is prematurely attempted by forcing the eject mechanism toward the eject position such that the arm 68 contacts the upper flange 58 and prevents it from moving downward, the lower spool 60 would similarly be immobilized and would thereby prevent lowering of the screw follower 42. This in turn could cause the stepper motor to stall, i.e., to count out, thus losing track of the zero reference position. To prevent such a malfunction, the spool is preferably formed of the two halves 70 and 72, so that regardless of whether the upper flanges 58 is fixed in position by premature operation of the eject arm 32, the lower flange 60 will nonetheless be free to move downward by virtue of downward motion of the screw follower member 42.

While the present invention has been disclosed hereinabove primarily with respect to a preferred embodiment, other alternative constructions as are readily apparent to one of ordinary skill in the art are also deemed to be within the scope thereof.

Having fully enclosed the present invention what is claimed is:

1. In a recorder adapted to receive data cartridges for incremental recording and playback of digital data on magnetic recording tape within the cartridge in which data is to be recorded and played back from a multiplicity of parallel tracks extending the length of the tape and in which a single record/playback head is adapted to interface with a tape driven along a transport path for the tape and to be variably positioned transversely with respect to the tape to enable the record and playback operations, a head positioning mechanism comprising
   (a) linear support means secured proximate to the transport path and perpendicular to the direction of tape motion,
   (b) head mounting means slideably mounted on the support means and adapted to receive the head for allowing linear travel of the head across the tape,
   (c) biasing means for directing the mounting means to move the head toward one edge of the tape in the absence of any counteracting force, and
   (d) means for driving the mounting means against the bias, thereby incrementally moving the head toward the opposite edge of the tape, and for controlling the motion of the mounting means as directed by the biasing means, thereby controlling the incremental movement of the head toward the first edge, said driving means including:
      (i) a stepper motor secured relative to the transport path having a drive shaft rotatably mounted therein,
      (ii) lead screw means mounted to the drive shaft of the stepper motor for converting rotary motion of the shaft into a corresponding linear movement, and
      (iii) means coupled to the lead screw for coupling the linear movement thereof to the head mounting means.

2. A mechanism according to claim 1, wherein said lead screw coupling means comprises a screw follower member cooperating with said lead screw and prevented from rotating therewith by bearing against guiding means to provide a non-rotating linear force on the head mounting means.

3. A mechanism according to claim 1, wherein said biasing means comprises a coil spring secured between the head mounting means and a support member common with the stepper motor so as to continuously force the head mounting means toward the lead screw, thereby eliminating any slack therebetween.

4. A mechanism according to claim 1, further comprising interlock means responsive to the linear movement of the lead screw and hence of the head transverse to the tape for interacting with ejection means adapted to eject said cartridge from the recorder, allowing activation of the ejection means only when the lead screw is positioned so that the head gap is adjacent or below one edge of the tape.

5. A mechanism according to claim 4, wherein the interlock means comprises a spool means slideably mounted parallel to the screw for movement between a first position at which the ejection means can be freely activated and a second position at which said spool means inhibits such activation, and means coupled to said screw for moving said spool means from said second position to said first position.

6. A mechanism according to claim 5, wherein said spool means comprises a spool having central cylindrical portion and outer flanges, the center portion being split axially into two semicylindrical segments each of which terminates at one of the flanges, and wherein said screw coupled moving means is adapted to bear against one of the flanges so as to slideably move the spool while the other flange is adapted to inhibit activation of said ejection means, the two segments thus allowing one segment to be moved along with the head mounting means to lower the head despite immobility of the other flange such as may occur due to attempted activation of the ejecting means.

* * * * *